United States Patent [19]

Jerina

[11] Patent Number: 5,246,030
[45] Date of Patent: Sep. 21, 1993

[54] SAFETY VALVE ARRANGEMENT

[75] Inventor: Frank J. Jerina, Irwin, Pa.

[73] Assignee: Westinghouse Air Brake Company, Wilmerding, Pa.

[21] Appl. No.: 994,159

[22] Filed: Dec. 21, 1992

[51] Int. Cl.⁵ .............................................. F16K 17/06
[52] U.S. Cl. .................................... 137/478; 251/363
[58] Field of Search ................ 137/469, 476, 478; 251/360, 363

[56] References Cited

U.S. PATENT DOCUMENTS

| | | | |
|---|---|---|---|
| 606,867 | 7/1898 | Hoover | 251/360 X |
| 2,874,718 | 2/1959 | Kelly | 137/469 |
| 4,355,657 | 10/1982 | Reip | 137/469 X |
| 4,406,302 | 9/1983 | Olesen | 137/469 X |
| 4,474,208 | 10/1984 | Looney | 251/363 X |
| 4,790,348 | 12/1988 | Gausman et al. | 251/363 X |
| 4,799,506 | 1/1989 | Taylor | 137/469 |
| 5,056,548 | 10/1991 | Mills | 251/363 |
| 5,188,150 | 2/1993 | Esplin | 251/360 X |

Primary Examiner—Stephen M. Hepperle
Attorney, Agent, or Firm—John B. Sotak

[57] ABSTRACT

A safety or pressure relief valve which relieves excessive pressure in a storage reservoir in a compressed air system. The valve includes a lower valve body and an upper valve housing. A valve seat member is secured in the lower valve body. The valve seat member includes an annular dovetail groove for accommodating and retaining a fluorocarbon rubber O-ring seat. A valve disc and stem slidable within a stem guide member located in the upper valve housing. A compression spring for urging the valve disc against the fluorocarbon rubber O-ring seat to positively seal off the flow of air between an inlet and outlet port.

11 Claims, 2 Drawing Sheets

SAFETY VALVE ARRANGEMENT

FIELD OF THE INVENTION

This invention relates to an improved safety valve, and, more particularly, to a pressure relief valve having a pliable seat which positively seals compressed air in a storage reservoir and which causes the valve to be quickly and explicitly opened to exhaust air to the atmosphere when the level of the pressure exceeds a predetermined value.

BACKGROUND OF THE INVENTION

In the past, there have been many forms of safety or pressure relief valves for effectively dissipating and exhausting excessive compressed air in a storage reservoir, or the like, to the atmosphere. Generally, these previous spring-load valves include a metallic poppet valve which coacted with a metallic seat to quickly open the valve when a preselected pressure is attained and to sharply close the valve when a definite amount of blow-down has occurred. Normally, these metallic safety valves initially require intricate and expensive machining, and subsequently require extensive and costly lapping operation to attempt to match the mating surfaces of the valve and the valve seat. It has been found that even after all this time-consuming and precision operation to attain the required close tolerances, the metallic safety valves are still prone to leaking either during initial testing or subsequently in service. While there have been numerous attempts to reduce manufacturing time and overall costs of producing metallic type of safety valves, these previous endeavors were also possessed of a number of shortcomings, such as requiring expensive and special designed gaskets or annular sealing rings. Further, the previous attempts to use O-rings as sealing elements failed either because of being blown out from the valve member or because of chafing and excessive wearing during the opening and closing of the valve member with the valve seat.

OBJECTS AND SUMMARY OF THE INVENTION

Accordingly, it is an object of this invention to provide a new and improved safety valve for relieving excessive pressure in a storage medium to atmosphere.

Another object of this invention is to provide an improved pressure relief valve which employs a pliable O-ring valve seat which positively seals and prevents leakage of the valve member.

Yet a further object of this invention is to provide unique safety valve which includes a valve disc member which is seated against a resilient O-ring seat to effectively prevent leakage when the safety valve is in a closed position.

Yet another object of this invention is to provide a new pressure relief valve which includes a fluorocarbon rubber O-ring seat which provides a soft seat for a valve head disc.

Still another object of this invention is to provide a pressure relief valve comprising a lower valve body having inlet and outlet passageways, an upper valve housing secured to the lower valve body, a valve seat member internally secured within the lower valve body, an annular groove formed on the upper end of the valve seat member, a resilient O-ring seat insert within the annular groove, an adjustable stem guide member secured within the upper end of the upper valve housing, a valve stem inserted into the adjustable stem guide member, a disc valve secured to the lower end of the valve stem, a biasing spring caged between the adjustable stem guide member and the disc valve for urging the disc valve against the resilient O-ring seat to close off a fluid communication path between the inlet and outlet passageways.

Still a further object of this invention is to provide an improved safety or pressure relief valve which is simple in design, efficient in operation, economical in cost, reliable in use, durable in service, unique in construction, and easy to use.

DESCRIPTION OF THE DRAWINGS

The above objects and other attendant features and advantages will be more readily appreciated as the present invention becomes better understood by reference to the following detailed description when considered in conjunction with the accompanying drawings, wherein.

DETAILED DESCRIPTION OF THE INVENTION

Figure 1:
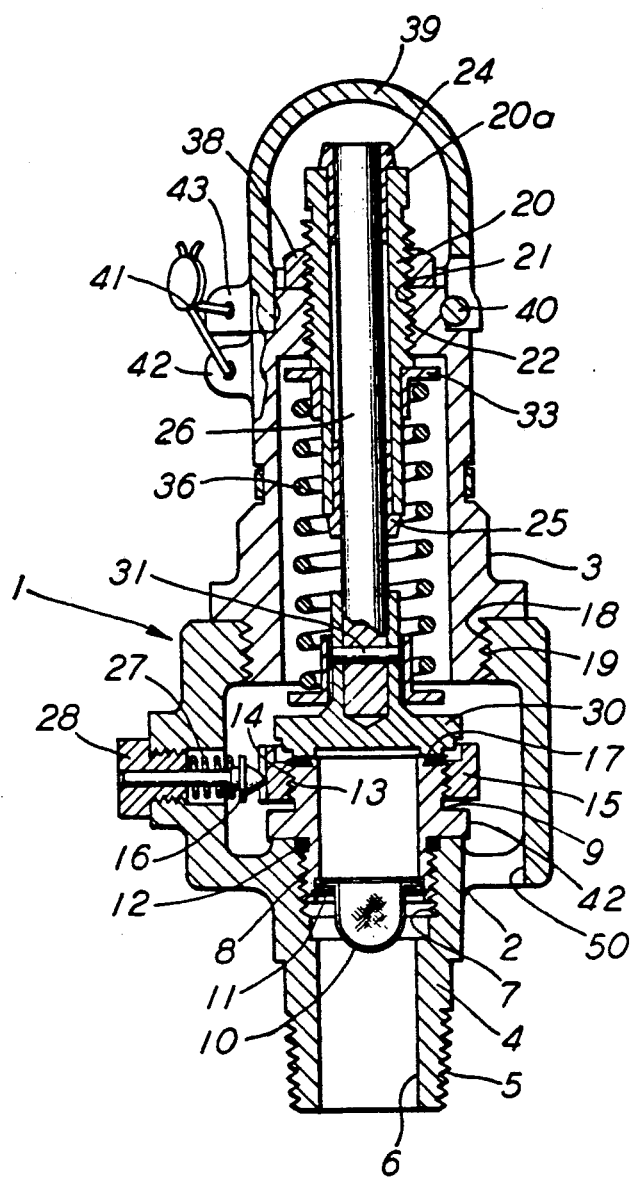
FIG. 1 is a side elevational view, with certain parts in section, of a safety or pressure relief valve assembly constructed in accordance with the present invention.
Figure 2:
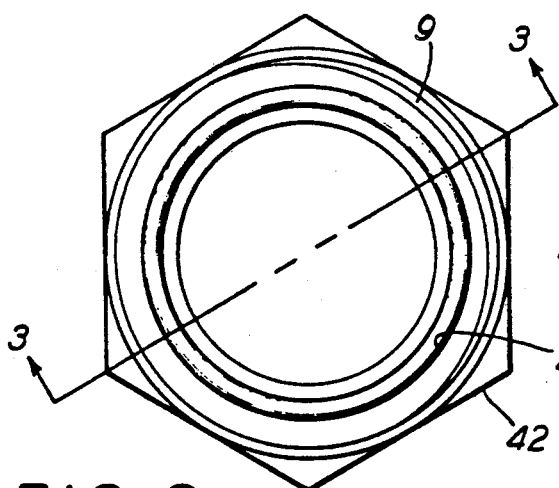
FIG. 2 is a top plan view slightly enlarged of the valve seat of the pressure relief valve of FIG. 1.
Figure 3:
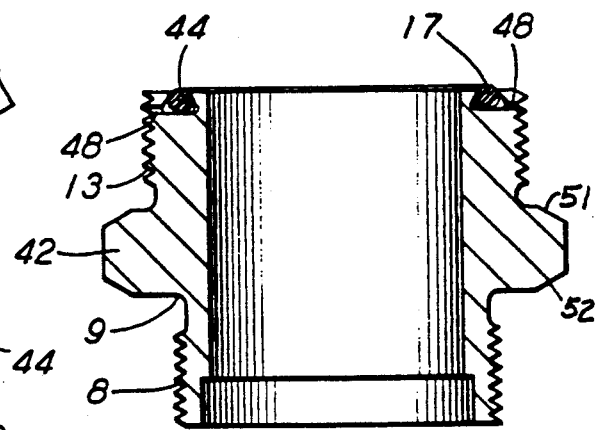
FIG. 3 is a vertical cross-sectional view taken along line 3—3 of FIG. 2.

Referring now to the drawings, and in particular to FIG. 1, there is shown a safety or pressure relief valve generally characterized by numeral 1. The valve 1 has a lower valve body portion 2 and an upper valve housing portion 3. It will be seen that the lower end of the housing 2 terminates in a nipple 4 having external pipe threads 5 for connecting the valve 1 to the threaded discharge port or opening of a main reservoir or other pressure device (not shown). It will be noted that the inlet passageway or chamber 6 includes an intermediate internal threaded portion 7 which receives external threads 8 formed on the lower end of a valve seat member 9. A thimble-shaped strainer 10 is held in place in the lower end of the valve seat member 8 by an external tooth retaining ring 11. The strainer 10 is designed to prevent dirt, dust and grit from entering the valve 1. An O-ring seal 12 prevents air leakage through threaded portions 7 and 8. As shown, the upper end of the valve seat member 9 includes an external threaded portion 13 which cooperates with an internal threaded portion 14 formed on an adjustable range ring 15 which establishes a pressure range. It will be appreciated that the exterior annular edge of the range ring 15 is serrated so that it may be rotated. After the range ring 15 is adjusted, it is locked in position by the tip of a locking pin 16. The locking pin 16 is urged into one of the notches of the serrated portion by a biasing spring 22 which is caged by an apertured locking screw 28. As will be described in greater detail hereinafter, the upper surface of the valve seat member 9 includes an annular dovetail-like recess or groove which accommodates a resilient O-ring seat 17. In practice, the O-ring seat element 17 is preferably composed of a flexible resilient material, such as, fluorocarbon rubber which has a wide temperature range ($-15°$ to $+400°$ F.) a low compression set, and an exceptional chemical compatibility.

It will be seen that the upper housing 3 includes a lower external threaded portion 18 which is screwed into an upper internal threshold portion 19 formed in the lower valve body 2. An adjustable stem guide member 20 is threaded into the upper end of housing via threaded portion 21 and 22. A pair of guide bushings 24 and 25 are press-fitted into the top and bottom ends of the guide member 20. The upper portion of a slidable valve stem 26 is inserted into the guide bushings 24 and 25. A valve header disc member 30 is attached to the lower end of stem 26 via a wrist pin 31. An upper cup-like spring keeper ring 33 rests against a shoulder formed on the guide member 20 while a lower cup-like spring keeper ring 34 rests against top surface of the valve disc 30. A coiled compression spring 36 is caged between the upper and lower keeper rings 33 and 34. Normally, the force of the compression spring 36 urges the valve disc 30 downwardly so that the lower annular surface of the valve disc 30 is seated against the soft O-ring seat 18 to cause the safety valve to assume its closed position. In practice, the openig pressure level for unseating the valve disc 30 for its seat 18 is regulated and set by placing a suitable wrench or the like on head 20a and either rotating the guide member 20 in a clockwise direction to increase the pressure or rotating the guide member 20 in a counterclockwise direction to decrease the pressure. After the appropriate valve of the opening pressure is set, the guide member 20 is locked in place by turning and tightening the locking nut 38 in a clockwise direction. The top end of the upper housing 3 is closed and the opening movement of the valve stem 26 is limited by a domed cap member 39. The cap 39 is pivoted about a hex head socket screw 40. After the cap 39 is closed, a sealing wire 41 is passed through the holes formed in the ears 42 and 43.

Figure 4:
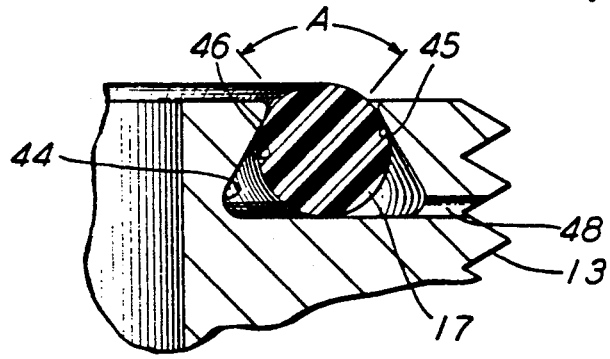
FIG. 4 is an enlarged sectional view of the annular groove and O-ring carried by the valve seat.
Figure 5:
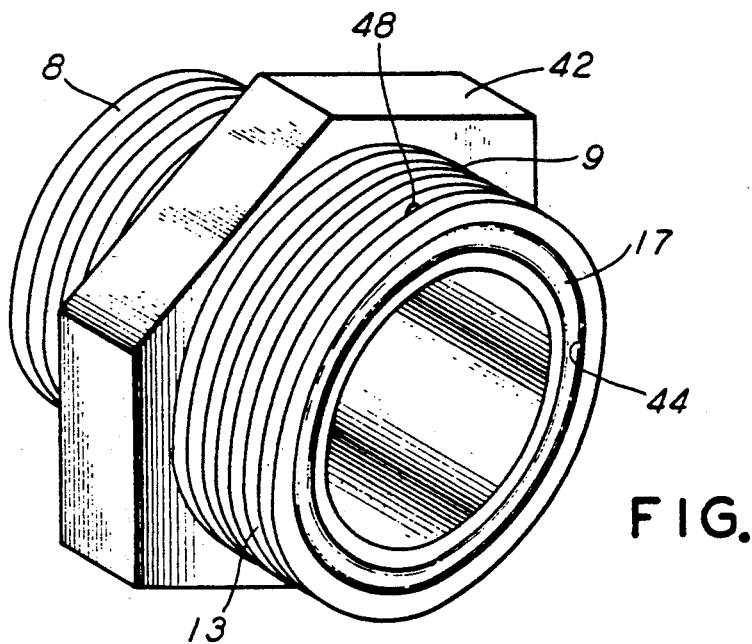
FIG. 5 is a perspective view of the valve seat which is internally mounted in the safety valve of FIG. 1.

Referring now to FIGS. 2, 3, 4 and 5, it will be seen that the valve seat member 9 is shown in greater detail in these enlarged views. As previously noted, the lwer reduced end of the valve seat member 9 is provided with external threads 8 while the upper end is provided with external threads 13. The intermediate portion of the valve seat member 9 is provided with a hex head portion 42 which is employed to securely tighten the valve seat member into the threaded portion 7 of the lower valve body 2. In practice, the hex head 42 may be chamfered to remove burrs and sharp corners, as shown by the beveled edges 50 and 51 in FIGS. 2 and 3. As shown in FIGS. 1, 2, 3, 4 and 5, the upper end of the valve seat member 9 includes an annular groove or recess 44 having a dovetail configuration. It will be noted that the depth of teh annular recess 44 is such that only a portion of teh upper surface of the resilient O-ring seat 18 protrudes beyond the top surface of the valve seat member 9. That is, the annular O-ring seat 18 has an exposed contact area which is equal to the diameter of the O-ring times the length of the arc A as shown in FIG. 4. In viewing FIG. 4, it will be seen that the two sloped or slanted sides 45 and 46 of the dovetail groove 44 frictionally engage the inner and outer upper sides of the rubber O-ring 18 to retain and capture the O-ring in the dovetail annular recess 44. A pair of diametrically opposed breather holes 48 communicate with the annular recess 44 to relieve any pressure build-up in the recess 44. Thus, during pressurization, any pressure in the recess 44 is relieved so that the O-ring 18 is not blown out of the annular recess 44.

In viewing FIG. 1, it will be noted that the flat underside of the disc valve 30 is firmly seated on the resilient O-ring seat to positively shut off the flow of air when the valve 1 is in its closed position. Now when the pressure in chamber 6 reaches a first preselected level which overcomes the compressive force of the biasing spring 36, the disc valve 30 is unseated to permit flow of air through outlet passageway or port 50 to atmosphere. Now when the pressure level drops to a second predetermined value, the opened disc valve 30 is reseated to shut off the flow of air from the chamber 6 to atmosphere. The soft valve seat 18 eliminates chattering and reduces wear so that the safety valve 1 has a longer useful life. The use of a resilient rubber O-ring seat not only eliminates the need of the tedious and costly lapping procedure, but also avoids the need of bright or case hardening of the disc valve and seat members.

Thus, the present invention has been described in such full, clear, concise and exact terms as to enable any person skilled in the art to which it pertains to make and use the same, and having set forth the best mode contemplated of carrying out this invention. I state that the subject matter, which I regard as being my invention, is particularly pointed out and distinctly asserted in what is claimed. It will be understood that variations, modifications, equivalents and substitutions for components of the above specifically-described embodiment of the invention may be made by those skilled in the art without departing from the spirit and scope of the invention as set forth in the appended claims.

What I claim is:

1. A pressure relief valve comprising a lower valve body having inlet and outlet passageways, an upper valve housing secured to the lower valve body, a valve seat member internally secured within the lower valve body, an annular groove formed on the upper end of the valve seat member, a resilient O-ring seat insert within the annular groove, an adjustable stem guide member secured within the upper end of the upper valve housing, a valve stem inserted into the adjustable stem guide member, a disc valve secured to the lower end of the valve stem, a biasing spring caged between the adjustable stem guide member and the disc valve for urging the disc valve against the resilient O-ring seat to close off a fluid communication path between the inlet and outlet passageways.

2. The pressure relief valve as defined in claim 1, wherein said annular groove takes the form of a dovetail cross-section.

3. The pressure relief valve as defined in claim 2, wherein said dovetail groove having a depth which is designed to cause said resilient O-ring seat to slightly protrude beyond the top surface of said upper end of said valve seat member.

4. The pressure relief valve as defined in claim 2, wherein said dovetail groove having a pair of slanted sides which engage and retain said resilient O-ring seat.

5. The pressure relief valve as defined in claim 1, wherein a plurality of breather holes communicate with said annular groove.

6. The pressure relief valve as defined in claim 1, wherein said valve seat member is threadedly screwed into said lower valve body.

7. The pressure relief valve as defined in claim 1, wherein said upper valve housing is threadedly screwed into said lower valve body.

8. The pressure relief valve as defined in claim 1, wherein said valve seat member includes an upper threaded portion for receiving an adjustable range ring.

9. The pressure relief valve as defined in claim 5, wherein plurality of breather holes bleed-off any air pressure which would tend to build up in said dovetail groove.

10. The pressure relief valve as defined in claim 1, wherein said resilient O-ring seat is formed of fluorocarbon rubber.

11. The pressure relief valve as defined in claim 1, wherein a cap member is mounted on the upper end of said valve member.

* * * * *